Dec. 1, 1970   EIZO GOTO   3,543,361
METHOD OF MANUFACTURING A REFLECTOR TYPE LAMP
Filed Aug. 15, 1968   4 Sheets-Sheet 1

INVENTOR
EIZO GOTO

Dec. 1, 1970  EIZO GOTO  3,543,361
METHOD OF MANUFACTURING A REFLECTOR TYPE LAMP
Filed Aug. 15, 1968  4 Sheets-Sheet 2
FIG. 5
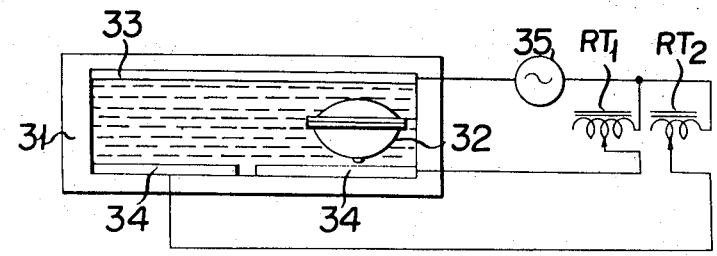
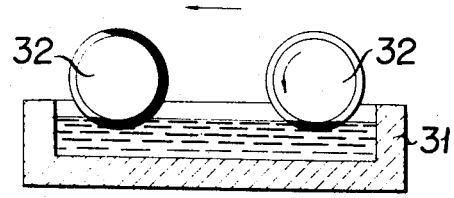
FIG. 6(a)
FIG. 6(b)
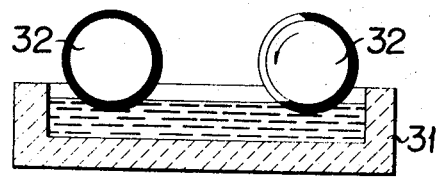
FIG. 7
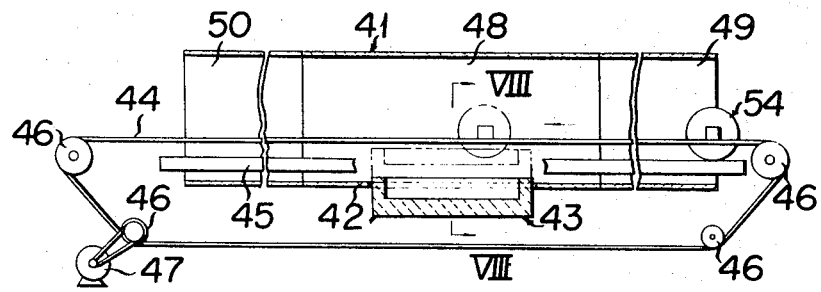
INVENTOR
EIZO GOTO Dec. 1, 1970   EIZO GOTO   3,543,361
METHOD OF MANUFACTURING A REFLECTOR TYPE LAMP
Filed Aug. 15, 1968   4 Sheets-Sheet 3

INVENTOR
EIZO GOTO

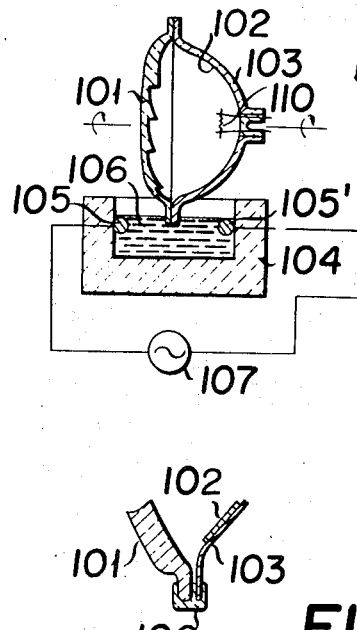
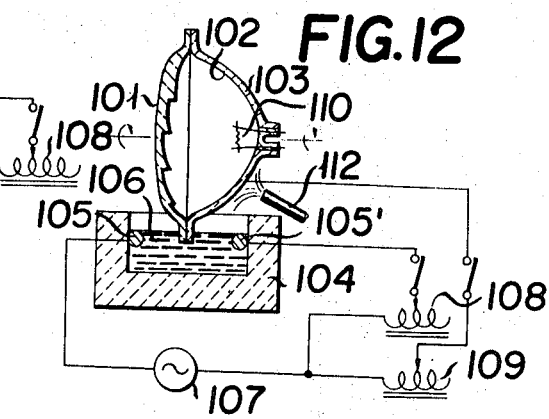
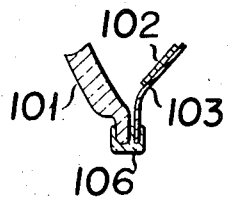
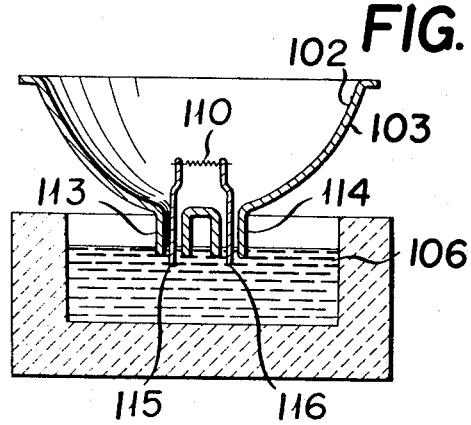
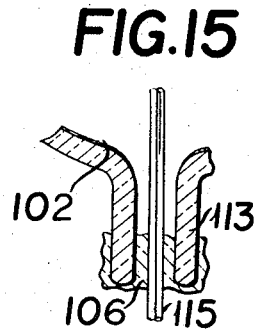

United States Patent Office 3,543,361
Patented Dec. 1, 1970

3,543,361
METHOD OF MANUFACTURING A REFLECTOR TYPE LAMP
Eizo Goto, 6–15, 1-chome, Higashi Kaigon Kita, Chigasaki-shi, Japan
Continuation-in-part of applications Ser. No. 617,948 and Ser. No. 618,123, both filed Feb. 23, 1967. This application Aug. 15, 1968, Ser. No. 752,885
Claims priority, application Japan, Feb. 28, 1966, 41/18,035; Jan. 12, 1967, 42/1,960
Int. Cl. H01j 9/18; C03c 27/04
U.S. Cl. 29—25.13       1 Claim

ABSTRACT OF THE DISCLOSURE

Method of manufacturing a reflector type lamp wherein a filament carrying lead wires is inserted through open projections which extend outwardly from a reflector. The filament is located at the focal point of the surface of the reflector, and then the inner edge of the projections together with the lead wires are dipped into and withdrawn from a body of molten glass to seal the two parts together. Then, a lens is juxtapositioned with the reflector by holding the outer edge of the reflector to the outer edge of the lens. The outer edges are then progressively dipped into and removed from a body of molten glass by rotating the outer edges at a speed sufficient to allow the molten glass to adhere to the edges to thus seal the edges to each other. The molten glass is heated by a pair of electrodes as well as by a further electric current which passes between the metallic reflector and one of the electrodes.

---

This application is a continuation-in-part of the disclosure in pending application Ser. No. 617,948, filed Feb. 23, 1967, now abandoned; and Ser. No. 618,123, filed Feb. 23, 1967, now abandoned.

BACKGROUND OF THE INVENTION

The present invention relates to a reflector type lamp, i.e., a lamp having a metallic reflector, and more particularly to an arrangement for sealing with glass by immersing contacting portions into molten glass.

In the manufacture of the conventional reflector type lamps such as automobile headlights, vitreous materials are used for the body of reflector, that is, said vitreous materials are first press-molded and then coated by evaporation on the inner side with a metal layer.

The reflector type lamp is generally required to satisfy strict light reflecting conditions i.e., light must be properly reflected. But manufacturing of the conventional reflector type lamp has many difficulties, such as, perhaps an incorrect light axis due to distorted sealing between the reflector and the lens, or those where the metal layer is damaged. Thus, a relatively high percentage of the lamps manufactured are not suited for use. In addition, in order to provide sufficient physical strength to the vitreous reflector, the wall thereof is made very thick and this makes the finished lamp very heavy.

Further, in the manufacture of a reflector type lamp the mounting of the filament has heretofore been carried out by first welding ferrules in the stem of the reflector, applying a soldering material such as borax, brass, etc., as the flux melting the soldering material by means of burner flames, inserting leads of the filament in the respective ferrules, dipping the lower ends in the soldering material, placing the filament at a predetermined position, and cooling the dipped ends to complete the filament mounting. This method, as mentioned above, requires the welding of ferrules and this makes the process very complicated. Furthermore, sealed portions involving metal details are subject to cracks and resultant air leakage, and the residue of the flux used often becomes a source of undesirable gases.

However, we have found that a reflector type lamp of light weight, simple structure and of excellent mechanical strength can be obtained by employing as a reflector, a metallic material, and, by using as a sealing material a soldering glass which has a coefficient of thermal expansion substantially equal to the details to be fixed.

It is well known in the art to heat glass portions to be sealed by passing an electric current through them so as to fuse and seal these portions. However, the property of glass is usually such that it is an electric non-conductor at room temperature but rapidly increases its conductivity when fused at an elevated temperature so that it is necessary to preheat the seals to a certain extent to make possible heating by an electric current. Where the seals are preheated by means of a gas burner, for instance, and are then caused to fuse by the heat generated by an electric current passed through the seals it is very difficult to preheat the entire portion of seals to a uniform temperature because of low heat conductivity of glass. As a consequence, portions at higher temperatures are effectively heated by electric current and hence fused rapidly whereas portions at lower temperatures are difficult to heat by the flow of electric current. Thus some of the seal portions will be well fused while the other not well, thus interfering with obtaining seals of uniform quality. Further, if a current path were formed at portions other than the sealed portion for any reason most of the current supplied for the purpose of fusion would be by-passed around the seal, thus resulting in insufficient fusion of the seal. Accordingly, such a method of heating by electric current can not be used to join glass and a material having higher electric conductivity than glass, such as metal, for example.

SUMMARY OF THE INVENTION

This invention contemplates providing a method of sealing with glass portions of a reflector type lamp to be sealed, comprising the steps of using molten glass, establishing an electric current path through said molten glass to heat the same and rotating the lamp including seals so that they are successively dipped into and withdrawn from the molten glass through which the current path has been established.

Sealing is effected by a layer of glass which has solidified after adhesion to the portions to be sealed. The glass layer will be caused to adhere to the entire surface of the predetermined portion to be sealed by the movement thereof as the article is rotated. The glass adapted to form the glass layer is fused and since the molten glass is heated to have a desired viscosity by an electric current flowing through the molten glass it will intimately and evenly adhere to the entire portions to be sealed which are dipped in the molten glass. As a consequence, effective seals with glass can be provided not only where the whole portion to be sealed is made of glass but, for example, to metal.

BRIEF DESCRIPTION OF THE DRAWINGS

In the accompanying drawings.

FIG. 5 is a similar view of another modification;

FIGS. 6a and 6b are sectional views to explain the order of dipping the portions to be sealed in the molten glass in the apparatus shown in FIG. 5;

FIG. 7 is a sectional view of a still further modification;

FIG. 11 is a sectional side view of another version of an apparatus for providing a seal according to this invention;

FIG. 12 depicts a modification of FIG. 11;

FIG. 13 shows a partially enlarged sectional view of the detail sealed;

FIG. 14 illustrates a process for mounting a filament; and,

FIG. 15 shows a partially enlarged sectional view of the detail sealed in FIG. 14.

DETAILED DESCRIPTION

Figure 1:
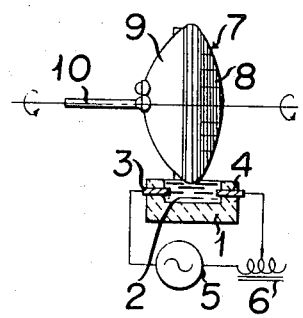
FIG. 1 shows a longitudinal section of a sealing apparatus used in connection with this invention and the associated electric circuit.

Referring now to the accompanying drawing, FIG. 1 illustrates a sealing apparatus utilized to seal portions to be sealed on a sealed beam lamp. A tank 1 made of a suitable refractory material is filled with molten glass which is heated to a temperature at which sufficient fluidity by external heating means is assured. A pair of electrodes of non-fusible metal such as tungsten, molybdenum and the like or carbon are disposed to penetrate through side walls of the tank 1 at a level below the liquid surface of the molten glass, one of the electrodes 3 being connected to one terminal of a source of supply 5 whereas the other electrode 4 is connected to the other terminal of the source via a variable impedance of a variable stabilizer 6.

When a voltage is impressed between terminals 3 and 4 from the source of supply 5, a current will flow from one terminal to the other through the molten glass to increase the temperature thereof. For example, where the molten glass consists of soda-lime glass, by applying an alternating current of 50 cycles per second across the electrodes 3 and 4 it is possible to increase the temperature from 1400° C. to 1500° C., the viscosity of the molten glass at this temperature being about 100 poises.

Portions to be sealed of a sealed beam lamp 7 are dipped in the body of the molten glass 2. As shown in FIG. 1, the sealed beam lamp 7 comprises a bowl-shaped lens portion 8 of transparent glass and a bowl-shaped reflector portion 9 made of glass having a reflecting film deposited on the inner surface thereof. To the back of the reflector portion 9 is connected an exhaust tube 10 adapted to evacuate the interior of the lamp after sealing. The lens portion 8 and the reflector portion 9 are aligned to maintain a predetermined relative position and the assembly is held by suitable holding mechanism, not shown, that can rotate the assembly around the axis thereof. The holding mechanism operates to move portions of the lamp 7 to be sealed while together, a little at a time, into the molten glass 2 while rotating the lamp 7 at a low speed.

Molten glass which has been heated to have sufficient fluidity adheres to those portions of the portions to be sealed which have been dipped in the body of the molten glass, and as these portions are moved by the rotation of the lamp 7, a glass layer having a suitable thickness will be formed over the entire portion to be sealed. The sealing operation is completed during one complete revolution of the sealed beam lamp 7 while its portions to be sealed are held immersed in the molten glass. However, if desired, the portions to be sealed may be dipped twice or more times.

Generally stated, the temperature of portions to be sealed and to be dipped in the molten glass is lower than the temperature of the molten glass. Consequently, portions of the molten glass which come into contact with the portions to be sealed are rapidly cooled to increase viscosity. However, since electric current supplied through the electrodes are flowing through these portions of the molten glass, cooled molten glass will be heated by the Joule heat provided by the current to compensate a temperature drop, thus maintaining the viscosity at the desired value. Conduction of heat from the molten glass contributes heat to portions yet to be sealed to improve wettability of these portions by molten glass in contact with them thus ensuring intimate and uniform adhesion of the molten glass to the portions to be sealed.

Figure 2:
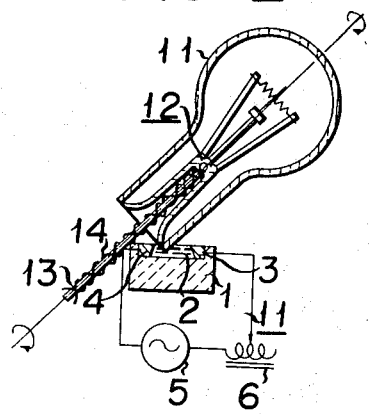
FIG. 2 shows a side elevation, partly in section, of a modified sealing apparatus.

FIG. 2 shows a modification of this invention by which a seal is provided between a glass globe or bulb 11 of an incandescent lamp and a mount 12. The step of the mount is of the flared type with its flared portion positioned close to the neck of the glass globe 11 to form portions to be sealed. The mount 12 is provided with an exhaust tube 13 and lead-in conductors 14 both extending in the direction away from the glass globe 11.

Figure 3:
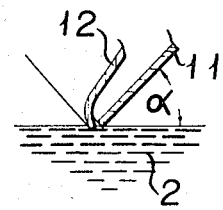
FIG. 3 is an enlarged partial view showing the manner of contact between portions to be sealed and molten glass.

The tank 1 containing molten glass is substantially the same as that shown in FIG. 1 except electrodes 3 and 4. Thus, portions corresponding to those of FIG. 1 are designated by the same reference numerals and their description is omitted. The axis of the mount 12 is inclined with respect to the liquid level of the molten glass so that portions to be sealed are successively brought into contact with the molten glass 2. The glass globe 11 and the mount 12 are held at this desired angle by means of an appropriate holding mechanism, not shown, and are rotated at a low speed as in the previous embodiment. As best shown in FIG. 3, the open end of the glass globe 11 and the lower end of the mount 12 are simultaneously immersed in the molten glass so that these portions will be sealed with glass as above described.

A glass globe consisting of soda-lime glass having a thermal expansion coefficient of $9.8 \times 10^{-6}$ cm./cm./° C., a softening temperature of 620° C. and a diameter of 22.5 mm. at the opening, a wall thickness of 2.5 mm., and a stem of a mount consisting of the same soda-lime glass and having a diameter of 18 mm. at the opening and a wall thickness of 0.8 mm. were sealed by dipping their portions to be sealed in a molten glass of a low melting point having a thermal expansion coefficient of $9.1 \times 10^{-6}$ cm./cm./° C. and a softening temperature of 570° C. The result of this experiment showed that a highly air tight and strong seal could be completed in 8 seconds. In this experiment the molten glass was heated to a temperature of 1300 to 1400° C. by a current of the density of 2.5 A./cm.$^2$ which was supplied by a pair of molybdenum electrodes and the glass globe and the mount supported at an angle of about 30° with respect to the liquid level were rotated through one complete revolution.

When rotating an article including portions to be sealed, by effecting a relative movement between the article and the molten glass in a direction parallel to the plane of the liquid level, a more satisfactory type of seal can be formed. This is because portions to be sealed which are successively immersed in the molten glass come into contact with new molten glass, thus the temperature thereof has not been lowered by previous contact with portions to be sealed.

Figure 4:
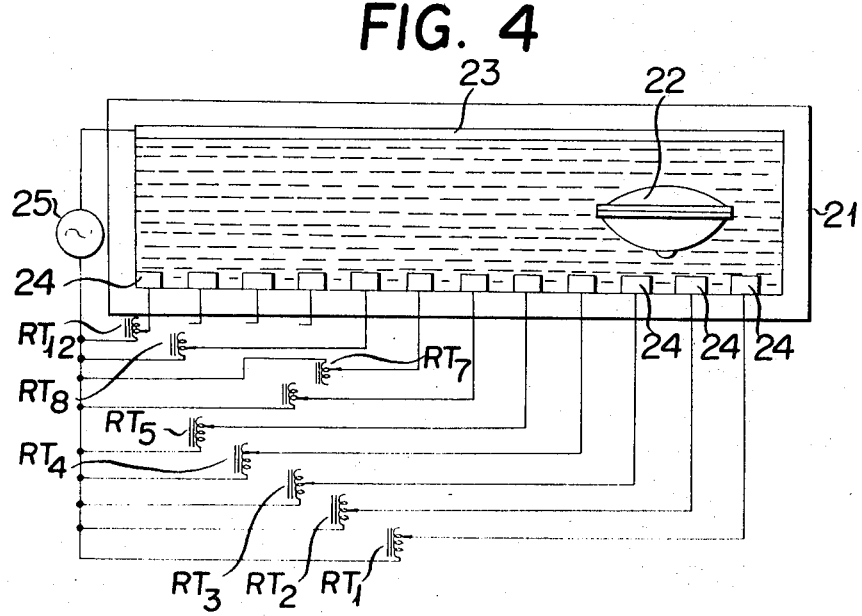
FIG. 4 is a plan view of a further modification of the sealing apparatus and its associated electric circuit.

FIG. 4 shows a tank designed to permit an article including portions to be sealed to move in the direction parallel to the liquid level of the molten glass. The configuration of the tank is of an elongated rectangle, the length of its wider side being somewhat longer than the peripheral length of the sealed portion of the article, for example, a sealed beam lamp. On one of the opposed inner surfaces of the wider sides of the tank 21 is mounted a coextensive electrode 23 and a plurality (for example 12) of closely spaced electrodes 24 are provided on the opposoite side wall. One electrode 23 is connected to one terminal of a suitable source of supply 25 while the other twelve electrodes 24 to the other terminal of the source through respective variable reactors RT.

The tank 21 is filled with molten glass which is heated by electric current flowing through it between the electrode 23 and the divided electrodes 24 to have a viscosity suitable for sealing, for example, for 30 to 100 poises.

The sealed beam lamp 22 is to be sealed and held by means of a suitable holding mechanism (not shown) designed to rotate the lamp about its axis and to move it in the longitudinal direction of the tank 21. At first, portions of the lamp to be sealed are dipped in the molten glass at a place close to one of narrower sides of the tank. Then while rotating, the lamp is moved toward the opposite side of the tank 21 at a speed substantially equal to the peripheral speed of the sealed portion. After completion of one revolution, the lamp is withdrawn from the molten glass.

FIG. 5 illustrates a modified apparatus wherein an article including portions to be sealed is moved in the direction parallel to the liquid level of the molten glass 2 while rotating. In this modification the length of the tank 31 is about one-half of the peripheral length of the portions to be sealed of an article, for instance, a sealed beam lamp 32. As before, one wider side of the tank is provided with an electrode coextensive therewith and the other side two divided electrodes 34, said longer electrode 33 being connected to one terminal of a suitable source of supply 35 whereas divided electrodes 34 to the opposite terminal of the source through their respective reactor RT.

The molten glass contained in the tank 31 having submerged therein electrodes 33 and 34 is heated to a desired uniform temperature by an electric current supplied thereto from the source 35 via variable reactors RT, in the same manner as in the previous embodiments. At first, portions to be sealed of the sealed beam lamp 32 are dipped in the molten glass at a portion close to one of the narrower sides of the tank 31. Again, the sealed beam lamp is held by a holding mechanism, not shown, that can move it in the longitudinal direction and in parallel with the liquid level of the molten glass while rotating the lamp. As shown in FIG. 6a, the sealed beam lamp is brought to the opposite side of the tank when about one-half of the portions to be sealed have been dipped in the body of the molten glass. At this point the lamp is withdrawn from the molten glass, returned to the original starting position without any rotation and again lowered to be immersed in the molten glass. Thereafter, as shown in FIG. 6b, rotation and movement are again repeated to complete sealing of remaining portions.

In this case, the length of the tank 31 can be reduced to about one-half of that shown in FIG. 4 thus reducing the physical size of the apparatus and enabling easy control of the molten glass.

In the embodiments shown in FIGS. 4 to 6 the relative movement between an article including portions to be sealed and the molten glass can also be effected by the movement of the tank containing the molten glass.

Figure 8:
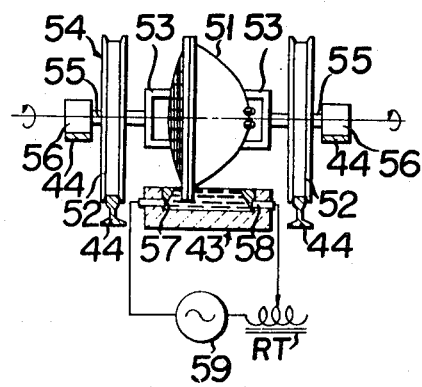
FIG. 8 is a sectional view taken along a line VIII—VIII in FIG. 7.

FIGS. 7 and 8 indicate an apparatus capable of effecting continuous sealing in accordance with this invention. At the bottom of an elongated tunnel shaped furnace 41, there is provided an opening 42 through which a tank 43 adapted to contain the molten glass is elevated and lowered by means of a suitable elevator mechanism, not shown. A pair of endless conveyers 44 and a pair of rails 45 are provided in the furnace 41. Conveyers 44 run about a plurality of pulleys 46 so as to move along a definite path, which are driven by a driving source 47, such as an electric motor. Suitable heating means are mounted in the furnace 41 to define a sealing region 48 of the highest temperature at the center, a preheating region 49 of lower temperature at the entrance of the furnace and a slow cooling region 50, also of lower temperature than the sealing region at the exit portion of the furnace.

As best shown in FIG. 8, a sealed beam lamp 51 including portions to be sealed is supported by a holding mechanism 53 provided between a pair of wheels, and the assembly 54 is mounted on a movable carriage such that wheels 52 rest on respective rails 45. Further rollers 56 mounted on the outer ends of the shafts 55 of the wheels 52 are arranged to cooperate with conveyers so that the assembly 54 will be rotated and moved along rails as the conveyers run. When the assembly reaches a position above the molten glass contained in the tank 43 as it is moved from the entrance toward the exit of the furnace 41, the tank 43 will be elevated so as to immerse portions to be sealed of assembly 54 and again lowered to the original position when the assembly reaches the other end of the tank 43.

The length of the tank 43 is slightly longer than the peripheral length of the seal of the sealed beam lamp 51 and one of the wider sides of the tank is provided with a coextensive electrode 57 whereas the other side has divided electrodes 58, the longer electrode 57 being connected to one terminal of a source of supply 59 while the divided electrodes 58 to the opposite terminal thereof, through variable reactors RT.

It is to be noted that contact portions of wheels 52 of the assembly should have substantially the same configuration and dimension as those of the seal. With such a construction, as the center of rotation of the assembly 54 moves in the vertical direction in accordance with the configuration of the seal it is possible to dip in the molten glass a seal of a configuration other than a circle, for example, an ellipse. Where the seal is circular the assembly 54 is moved at the same speed as its peripheral speed.

Heating of the atmosphere in which sealing operation is performed by means of a heating mechanism, such as a tunnel furnace, is extremely effective to provide satisfactory seals and to prevent damage of the article at the time of sealing. In the embodiment shown in FIG. 7 the periphery of the tank 43 is heated by the furnace 41 and such a heated region extends on both sides of the tank 43. As a consequence the sealed beam lamp 51 introduced into this heated region from the entrance of the furnace 41 will be preheated while it passes through the preheating region 49 close to the entrance whereby portions thereof to be sealed will be preheated to the desired temperature before they are brought into contact with the molten glass.

It is desirable to select the temperature of the atmosphere in the sealing region to be higher than the annealing temperature of the molten glass used to form the seal. This is necessary to improve adhesion of the molten glass to the seal during a sealing operation and to prevent creation of internal strain in the solidified glass adhering to the seal or avoid creation of cracks caused by such strain. More particularly, where the temperature of the atmosphere is low, because the molten glass is cooled by the contact with portions to be sealed the viscosity of the molten glass at that contact has a tendency to increase so that an excessive amount of molten glass will adhere to the seal when it is withdrawn, thus impairing the configuration of the completed seal. In addition, the electric resistance of such a cool portion of the molten glass is increased which decreases the current density flowing through it. Accordingly, the effect of temperature compensation provided by the heating action of current is decreased and the tendency to increase the viscosity is promoted. Also, portions to be sealed with glass will be heated to a temperature higher than its annealing temperature by being in contact with the high temperature molten glass, and when they are rapidly cooled after removal from the molten glass, a large strain will be created between the seal and other portions. In sealing articles comprised by a material relatively free from such a strain, for example metal, the molten glass which has adhered to the seal and withdrawn upwardly from the tank will be rapidly cooled by being contact with cool atmosphere, thus similarly creating strain therein.

On the other hand where the atmosphere is heated to an elevated temperature above the annealing temperature of either the sealing glass or molten glass as the seal is already heated to an elevated temperature sufficient to prevent excessive decrease in the temperature of the molten glass so that the seal and the molten glass adhering thereto would not be cooled below the annealing temperature when they are withdrawn from the molten glass, thus completely eliminating all troubles caused by a large temperature difference between the seal and the molten glass.

Figure 9:
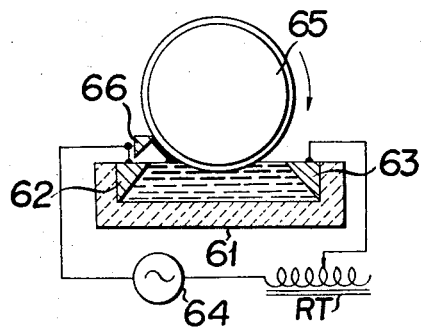
FIGS. 9 and 10 show sectional views of another modification of this invention.
Figure 10:
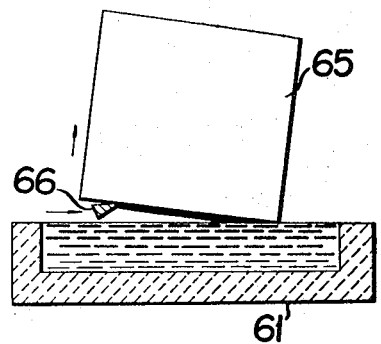

FIGS. 9 and 10 illustrate a modification of this invention wherein a shaping mechanism is provided to control the configuration of the molten glass that has adhered to the seal. Referring to FIG. 9, a tank 61 is provided with a pair of electrodes 62 and 63 on the opposite sides thereof. One electrode 62 is connected to one terminal of the source 64 whereas the other electrode 63 to the opposite terminal of the source through a variable reactor RT. Interior of the tank 61 is filled with molten glass in sufficient quantity to immerse electrodes 62 and 63 and an article including a circular seal is held and rotated such that the seal is dipped in the molten glass. A suitable shaping mechanism 66 is situated at a position close to the liquid surface to contact with portions of the seal of the article 65 that have passed through the molten glass. The shaping mechanism is made of an electro-conductive material such as metal and connected to the same terminal as the electrode 62.

As the article 65 is rotated, a suitable quantity of the molten glass determined by the rotational speed of the article 65 and the viscosity of the molten glass will adhere to the portions to be sealed when they pass through the molten glass. However, a surplus of the adhered molten glass will be removed by a sharp edge of the shaping mechanism 66. Since at this time, a voltage from the source 64 is also applied to the shaping mechanism 66, the current will flow toward the opposite electrode 63 through molten glass which comes into contact with the sharp edge of the shaping mechanism and which is not yet solidified so maintaining the viscosity of the molten glass adhering to the seal, thus assuring easy removal of the surplus molten liquid.

Another advantage provided by the use of the shaping mechanism is that there is no difference in the quantity of adhered molten glass between the starting point and ending point of immersion of the seal in the molten glass. For example, where the periphery of the article to be sealed is circular the sealing operation can be performed during one complete revolution of the article as above described. When the last portion of the seal has passed through the molten glass and withdrawn therefrom, the molten glass will adhere upon the previously formed glass layer to increase the thickness of that portion. Such an uneven adhesion of the molten glass can be effectively eliminated by the action of the shaping mechanism.

Where the seal of an article is not circular the shaping mechanism may be moved to follow the configuration of the article. As shown in FIG. 10 when the configuration of the seal of the article 65 is square, for example, the contact position between the seal and the shaping mechanism 66 is varied as the article is rotated so that the shaping mechanism must be moved to follow this change. In FIG. 10, an electrode provided in the tank 61 and the electric circuit associated therewith are not shown, but portions corresponding to similar portions of FIG. 9 are designated by the same reference numerals. Further, where the configuration of the seal is circular the shaping mechanism is moved together with the article as the sealing operation is performed by moving the article as shown in FIG. 4.

In the description hereinbefore given, little has been said about the lead wires which must penetrate into the center of the reflector.

In making the lamp according to the arrangement shown in FIG. 11, lead wires are first inserted in an open projection outwardly projecting from the metallic reflector having a light reflecting layer, and are placed at a suitable position taking the position of the filament into consideration and held there in such a way that the inserted lead wires are kept off from the inner walls of the projection. The edge of the projection together with the edge of the leads is then dipped in the molten soldering glass having a coefficient of thermal expansion substantially equal to those of the section to be sealed, and the dipped section is drawn up so that a portion of the glass adheres to the metal section, and then the sealed portion is allowed to cool, thus fixing the lead wires to the lamp stem and electrically insulating the lead wires from the lamp stem by the soldering glass. Then the reflector having the filament and the lens are brought into correct registry with one another by optical means. The lens are clamped together and, progressively dipped in the molten soldering glass usually to a depth of about 1 to 2 mm. by rotating the clamped edges about the horizontal axis of the paraboloid, and are finally cooled to give a satisfactory seal.

The correct positioning of the filament according to this invention may be made by conventional mechanical or optical means. The ferrule conventionally used is dispensed with according to this invention, the positioning of the filament can be easily made in an inert gas atmosphere by optical means, that is, said positioning process can be conducted while said filament is lighted by passing electrical current through the lead wires.

The use of the metal reflector for the reflector type lamp makes it very light in weight and ensures greater physical strength when compared with conventional reflector type lamp having a glass reflector. As the sealing operation can be made after the deflector and lens have been clamped together in the correct position, slipping of the parts from normal position relative to each other during the operation is avoided. In particular, by passing an electric current through the sealed section to sufficiently heat the said sealed section an excellent seal is produced. Since the sealing operation is finished in a comparatively short time, damage to the metal layer deposited on the inner surface of the reflector is negligible. Further, in the case of the mounting operation, the use of a ferrule is not necessary, as the leads are directly sealed to the reflector by means of the soldering glass, so that there is no emission of undesirable gases due to otherwise incorporated flux.

The procedure hereinbefore described may be generally summarized by the explanation given in FIG. 11. Referring to FIG. 11 a front lens 101 made of sodium soda lead glass having a coefficient of linear expansion of $98 \times 10^{-7}$ cm./cm./° C. and a reflector 103 of one millimeter in thickness, made of nickel-iron alloy, coated with an inner reflecting metal layer 102, and having a paraboloidal inner surface and a coefficient of linear expansion substantially equal to that of the lens 101 are correctly put together and clamped. The peripheral edges of the clamped lamp are then successively dipped into the body of molten glass of substantially the same properties as those of the glass lens 101 within a crucible 104 by rotating the clamped lamp about the axis of the paraboloid of the reflector. At the same time, an A.C. alternating voltage from power source 107 is applied across a pair of electrodes 105 and 105' through a variable reactor 108, to maintain the soldering glass in a desired molten state by Joule heat from current passing through the soldering glass between the electrodes. The dipped edges to be joined of the lens 101 and reflector 103 are thus caused to adhere, with a certain amount of the soldering glass to hermetically seal these sections.

FIG. 12 illustrates a modification of the arrangement for carrying out the process as above described in a more efficient manner. In this embodiment, another A.C. voltage from the power source 107 is applied between the metal reflector 103 and the electrode 105 through a variable reactor 109, to further promote heating of the dipped edges of the lamp. Concurrently with this process air may be blown from a nozzle 112 against the wall of the reflector 103 adjacent to the dipped portions to produce effective cooling in order to prevent the metallic layer from deteriorating. FIG. 13 shows a sealed portion of a reflector type lamp bonded with the soldering glass. In other words, the metal reflector 103 serves as one of the electrodes.

FIG. 14 illustrates the operation of mounting the filament. Nickel-iron alloy leads 115 and 116 having a diameter of 0.8 mm. are respectively inserted through projections 113 and 114, each having an outer diameter of 5 mm. and projecting 5 mm. outwardly from and integral with a reflector 103 having a wall thickness of 0.5 mm., and made of a nickel-iron alloy having a coefficient of thermal expansion of $102 \times 10^{-7}$ cm./cm./° C. and deposited with light reflecting aluminum layer 102 on its paraboloidal inner surface. The filament is then correctly located in the focal point of the reflecting surface. While keeping the lead wires at substantially the center of the projections, the projections are dipped into the body of molten glass 106, having a coefficient of thermal expansion $90 \times 10^{-7}$ cm./cm./° C. and a softening temperature of 580° C., and being maintained at a viscosity of 50 poises, to a depth of 3 mm. for 2 seconds, and then drawn up and cooled at room temperature to obtain a sealed mount as shown in FIG. 15. The excesses of soldering glass adhering to the portions of the lead wires external to the interior of the said projections may be easily removed as they are very thin.

I claim:

1. A method for the manufacture of a reflector type lamp wherein a concave metallic reflector having a light reflecting layer therein is provided with outwardly extending open projections and lead wires carrying a filament are insulatedly inserted through said open projections, comprising the steps of:
   (a) inserting a filament carrying lead wires through said open projections which extend outwardly from the reflector leaving a space to the inner edge of said open projections;
   (b) locating the filament at the focal point of the surface of the reflector;
   (c) dipping the inner edge of the projections together with the lead wires into a body of molten glass bath having a viscosity ranging from 30 to 100 poises so as to hermetically seal said inner edge and said lead wires to each other;
   (d) withdrawing the dipped portions from the molten glass to allow a portion of the molten glass to adhere thereto;
   (e) solidifying the glass filled between the inner walls of said projections and the lead wires;
   (f) juxtapositioning said reflector now supporting said filament at the focal point thereof with an appropriate lens;
   (g) holding the outer edge of the reflector to the outer edge of the lens;
   (h) progressively dipping and removing the outer edges into a body of molten glass having a viscosity ranging from 30 to 100 poises by rotating the outer edges at a speed sufficient to allow the molten glass to adhere to the edges to hermetically seal said edges to each other, said body of molten glass being maintained in a desired molten state by passing an electric current through said glass between a pair of electrodes disposed at a level below the liquid surface of said molten glass while at the same time passing a further electric current between the metallic reflector and one of said pair of electrodes from a further source of power supply so as to facilitate heating of the outer edges;
   (i) withdrawing the outer edges from the molten glass; and,
   (j) solidifying the glass adhering to said edges by cooling said edges.

No references cited.

S. LEON BASHORE, Primary Examiner

S. R. FRIEDMAN, Assistant Examiner

U.S. Cl. X.R.
65—40, 42, 43, 59